United States Patent
Kamiya et al.

(10) Patent No.: US 8,186,156 B2
(45) Date of Patent: May 29, 2012

(54) AUTOMOTIVE CONSTRUCTION MACHINE

(75) Inventors: Shohei Kamiya, Ibaraki (JP); Yasushi Arai, Ibaraki (JP); Kazunori Nakamura, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 535 days.

(21) Appl. No.: 12/519,450

(22) PCT Filed: Mar. 6, 2008

(86) PCT No.: PCT/JP2008/054546
§ 371 (c)(1),
(2), (4) Date: Jun. 16, 2009

(87) PCT Pub. No.: WO2009/001587
PCT Pub. Date: Dec. 31, 2008

(65) Prior Publication Data
US 2010/0038162 A1 Feb. 18, 2010

(30) Foreign Application Priority Data
Jun. 26, 2007 (JP) ................. 2007-167686

(51) Int. Cl.
*F15B 7/00* (2006.01)
(52) U.S. Cl. ............... 60/420; 180/305; 180/307
(58) Field of Classification Search .......... 180/305–308; 60/420–430
See application file for complete search history.

(56) References Cited

U.S. PATENT DOCUMENTS

| | | | |
|---|---|---|---|
| 6,171,030 B1 * | 1/2001 | Miyake et al. | 405/258.1 |
| 6,872,043 B2 * | 3/2005 | Yukawa et al. | 414/694 |
| 7,503,419 B2 * | 3/2009 | Miyake | 180/327 |
| 8,037,963 B2 * | 10/2011 | Nishimura et al. | 180/291 |
| 2002/0104239 A1 * | 8/2002 | Naruse et al. | 37/348 |
| 2006/0021340 A1 * | 2/2006 | Vigholm et al. | 60/456 |
| 2006/0086009 A1 * | 4/2006 | Kuroiwa et al. | 37/245 |
| 2007/0074593 A1 * | 4/2007 | Mizuno et al. | 74/330 |
| 2008/0318727 A1 * | 12/2008 | Matsubara et al. | 477/3 |
| 2009/0013942 A1 * | 1/2009 | Yamada et al. | 123/41.65 |
| 2009/0084003 A1 * | 4/2009 | Nobayashi et al. | 37/347 |
| 2009/0199553 A1 * | 8/2009 | Nishimura et al. | 60/486 |
| 2010/0038162 A1 * | 2/2010 | Kamiya et al. | 180/69.6 |
| 2010/0319321 A1 * | 12/2010 | Kamiya et al. | 60/285 |

FOREIGN PATENT DOCUMENTS

| | | |
|---|---|---|
| JP | 2003-120277 A | 0/0420 |
| JP | 2000-85617 A | 3/2000 |
| JP | 2003-20936 A | 1/2003 |
| JP | 2005-248920 A | 9/2005 |
| JP | 2006-105014 A | 4/2006 |

* cited by examiner

*Primary Examiner* — J. Allen Shriver, II
*Assistant Examiner* — Erez Gurari
(74) *Attorney, Agent, or Firm* — Mattingly & Malur, PC

(57) ABSTRACT

A ureal water tank (28), a storage of an aqueous urea solution, is located within a utility room (6G) in a right front section of a revolving frame (6), which is readily accessible from outside. In this instance, among a plurality of operating oil conduits (18), a working mechanism operating conduit (21) which supplies operating oil to a boom cylinder (5D) of a working mechanism (5) is arranged to run along exterior surfaces of the ureal water tank (28). Therefore, even if the ureal water tank (28) is located in a place with no heat source, the aqueous urea solution in the ureal water tank (28) can be stably kept in a heated state by utilization of heat of operating oil in circulation through the working mechanism operating conduit (21).

9 Claims, 12 Drawing Sheets

AUTOMOTIVE CONSTRUCTION MACHINE

TECHNICAL FIELD

This invention relates to automotive construction machines such as, for example, hydraulic excavators, hydraulic cranes and wheel loaders, and more particularly to an automotive construction machine incorporating a urea selective reduction catalyst and ureal water tank in an upper revolving structure for the purpose of getting rid of emissions of nitrogen oxides in engine exhaust gases.

BACKGROUND ART

Generally, a hydraulic excavator, typical of automotive construction machines, is largely constituted by a vehicular lower structure which can be driven by a vehicle drive motor, an upper revolving structure swingably mounted on the vehicular lower structure for back and forth revolving motions, and a working mechanism liftably supported at the front of the upper revolving structure. An engine is mounted on the rear portion of a revolving frame on the upper revolving structure for the purpose of driving a hydraulic pump, while a cab, fuel tank and operating oil tank are mounted on front portions of the revolving frame.

In the case of a hydraulic excavator as mentioned above, it has been the general practice to employ a Diesel engine which is known for emissions of a large amount of nitrogen oxides (hereinafter referred to as "NOx" for brevity). In this regard, attempts have been made to depurate NOx emissions by installing a NOx purifying device on a hydraulic excavator as a post-treatment means (e.g., see, for example, Patent Literature 1: Japanese Patent Laid-Open No. 2003-120277).

On the other hand, for example, a NOx purifying device is largely constituted by a urea selective reduction catalyst incorporated into an engine exhaust conduit to get rid of nitrogen oxide in the engine exhaust gas, and a ureal water tank serving as a reservoir of ureal water, and a ureal water injection valve for injecting an aqueous urea solution from the ureal water tank at a position upstream of the urea selecting reduction catalyst (e.g., see, for example, Patent Literature 2: Japanese Patent Laid-Open No. 2003-20936).

In this connection, it is known that coagulation occurs to an aqueous urea solution in the ureal water tank when ambient temperature drops approximately to −10° C. or lower. In this regard, in Patent Literature 2, a ureal water tank is located in the vicinity of operational heat sources like an engine, hydraulic pump, control valve, hydraulic motor and operating oil tank which generate heat during operation, for the purpose of preventing coagulation of the aqueous urea solution.

However, in Patent Literature 2 mentioned above, an engine, hydraulic pump, control valve, hydraulic motor and operating oil tank are utilized as heat sources, and a ureal water tank is located in the vicinity of these heat sources. However, it is usually the case that each one of these heat source components including an engine, hydraulic pump, control valve, hydraulic motor and operating oil tank is located in a predetermined position on a revolving frame. That is to say, a position for installation of a ureal water tank is automatically determined by locations of heat source components, with almost no freedom in ureal water tank allocation. Depending upon the position of a ureal water tank relative to nearby components, it may become difficult to carry out a maintenance and service work, for example, a job of refilling an aqueous ureal solution into a ureal water tank.

Besides, a ureal water tank needs to be kept free of coagulation of the aqueous urea solution while a construction machine is in operation. However, as heat sources such as an engine, hydraulic pump, control valve, hydraulic motor and operating oil tank differ from each other in heat release value. Accordingly, depending upon a position of installation, it may become difficult to keep a ureal water tank at a constant temperature level.

Furthermore, in a case where a ureal water tank is located in the vicinity of a fixed engine or a hydraulic pump, the ureal water tank is heated only on the side which faces a heat source. In this case, temperature differences occur between different regions of the tank, making it difficult to heat stably the entire aqueous urea solution in the tank.

DISCLOSURE OF THE INVENTION

In view of the above-discussed problem with the prior art, it is an object of the present invention to provide an automotive construction machine which is so arranged as to give a great degree of freedom with regard to the position of installation of a ureal water tank and to keep an aqueous urea solution in the tank stably in a heated state to prevent coagulation of the urea solution.

(1) An automotive construction machine according to the present invention having a vehicle structure driven by a vehicle drive motor, a working mechanism operated by actuators mounted on the vehicle structure, an engine mounted on the vehicle structure to drive a hydraulic pump at the task of delivering pressurized oil, operating oil conduits for circulation of operating oil located between an oil pressure source which is comprised of the hydraulic pump and an operating oil tank, and various actuators including the vehicle drive motor of the vehicle structure and actuators of the working mechanism through a control valve, a urea selective reduction catalyst provided in an exhaust pipe of the engine to get rid of nitrogen oxides, and a ureal water tank storing an aqueous urea solution to be injected into the exhaust pipe of the engine on the upstream side of the urea selective reduction catalyst.

In order to solve the above-discussed problem, the automotive construction machine of the present invention is characterized in that one of the operating oil conduits is routed to run along exterior surfaces of the ureal water tank; and heating the aqueous urea solution in the tank by heat radiation from pressurized oil or return oil in circulation through the operating oil conduit.

With the arrangements just described, an operating oil conduit is routed to run along exterior surfaces of a ureal water tank to keep an aqueous urea solution in the tank in a heated state, directly utilizing heat radiation from pressurized oil or return oil in circulation through the operating oil conduit. Different from an engine or a hydraulic pump which needs to be installed in a predetermined position, the operating oil conduit can be routed arbitrarily almost free of positional limitations.

Thus, even in a case where the ureal water tank is located in an outer position on the vehicular body, the operating oil conduit can be easily extended to run along exterior surfaces of the ureal water tank. Thereby, an aqueous ureal solution in the ureal water tank is heated by a heat source, the heated pressurized oil and return oil in circulation through the operating oil conduit.

As a consequence, the aqueous urea solution in the tank can be kept in a heated state by the heat radiation from the operating oil conduit to prevent coagulation of the aqueous urea solution as caused by a temperature drop when in operation in a cold district. Besides, the ureal water tank can be located in an outer position on the vehicular body to facilitate a tank refilling job as well as maintenance work.

Further, the temperature of operation oil in circulation through the operating oil conduit is elevated by heat generation and frictional heat at the time of pressurization, and, as a heat source, relatively constant in temperature, so that it can easily keep the aqueous urea solution at a constant temperature level.

Furthermore, the operating oil conduit can be installed by a simple piping work with a great degree of freedom in routing position, angle or extent of bending, so that it can be easily arranged to run around the ureal water tank. Thus, the operating oil conduit can apply heat to the ureal water tank directly from around to keep an aqueous urea solution in the tank stably in a heated state.

(2) According to the present invention, the ureal water tank is in the form of a polyhedral container which is constituted by various sides, and the operating oil conduit is arranged to run at least along two sides of various sides.

Thus, the operating oil conduit is arranged to run along at least two sides of the ureal water tank in the shape of a polyhedral container, applying heat to the ureal water tank at least from two sides of the latter to keep the aqueous urea solution in the tank in a uniformly heated state.

(3) Further, according to the present invention, the operating oil conduit connected between the control valve and an actuator of the working mechanism is a working mechanism operating conduit, the working mechanism operating conduit being arranged to run along exterior surfaces of the ureal water tank.

Thereby, the working mechanism operating conduit which is connected between the control valve and an actuator of the working mechanism is utilized as an operating oil conduit. The working mechanism operating conduit is arranged to run along exterior surfaces of the ureal water tank keeping an aqueous urea solution in the tank in a heated state by heat radiation from heated operating oil in circulation between the control valve and an actuator of the working mechanism.

(4) According to the present invention, an oil cooler is provided between the control valve and the operating oil tank to cool down return oil from the actuator, the operating oil conduit connected between the control valve and the oil cooler is an oil cooler side return conduit, and the oil cooler side return conduit is arranged to run along exterior surfaces of the ureal water tank.

In this case, oil cooler side return conduit, which is connected between the control valve and the oil cooler, is used as an operating oil conduit. This oil cooler side return conduit is arranged to run along exterior surfaces of the ureal water tank, keeping an aqueous solution in the tank in a heated state by the heat of pressurized oil which is returned to the oil cooler from the control valve.

(5) According to the present invention, the operating oil conduit connected between the hydraulic pump and the control valve is a pressurized oil supply conduit, and the pressurized oil supply conduit is arranged to run along exterior surfaces of the ureal water tank.

Thus, a pressurized oil supply conduit which is connected between the hydraulic pump and the control valve can be utilized as an operating oil conduit. The pressurized oil supply conduit is arranged to run along exterior surfaces of the ureal water tank to keep an aqueous urea solution in the tank in a heated state by the heat of pressurized oil in circulation between the hydraulic pump and the control valve.

(6) According to the present invention, the automotive vehicular structure is composed of a vehicular lower structure driven by the vehicle drive motor, and an upper revolving structure which is swingably mounted on the vehicular lower structure, having an engine mounted in a rear side of a revolving frame to drive the hydraulic pump and having the working mechanism built in a front side of the revolving frame, and the ureal water tank is located on the upper revolving structure.

Thereby, the ureal water tank can be mounted in an arbitrary position on an automotive construction machine which is composed of a vehicular lower structure, upper revolving structure and working mechanism, for example, on an upper revolving structure of a hydraulic excavator at a readily accessible position on a revolving frame from the standpoint of facilitating a tank refilling job and maintenance work as well.

BEST MODE FOR CARRYING OUT THE INVENTION

Hereafter, with reference to the accompanying drawings, the present invention is described more particularly by way of its preferred embodiments which are applied by way of example to a crawler type hydraulic excavator, typical of automotive construction machines.

Shown in FIGS. 1 through 5 is an automotive construction machine in a first embodiment of the present invention. In this first embodiment, a working mechanism operating conduit which is connected between a control valve and an actuator of a working mechanism is utilized as an operating oil conduit to be enfolded around exterior surfaces of a ureal water tank.

Figure 1:
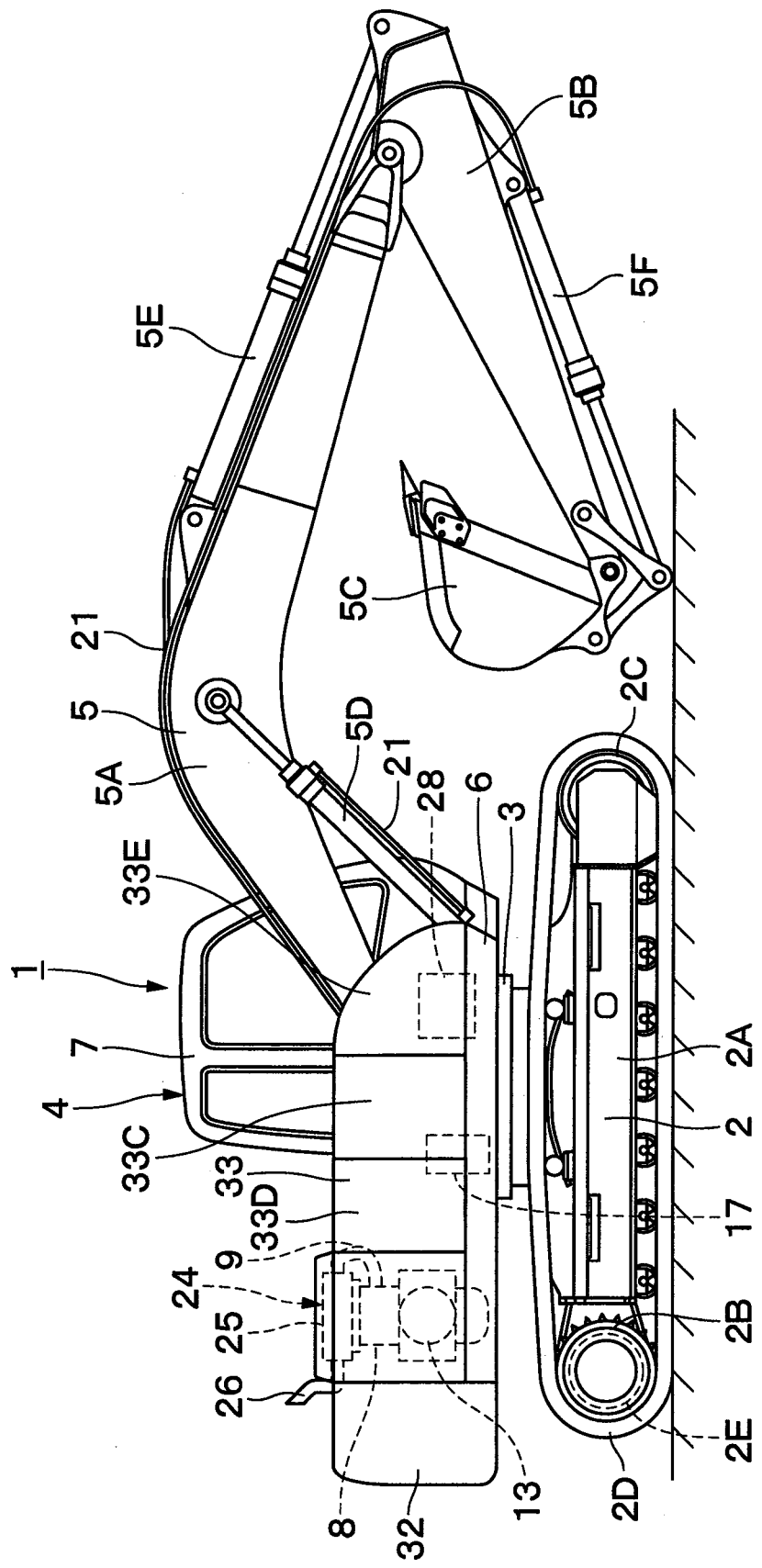
FIG. 1 is an elevation of a hydraulic excavator in a first embodiment of the present invention.

In the first place, given below is a description on the construction of a hydraulic excavator which is shown in FIG. 1 as an example of automotive construction machines.

The hydraulic excavator 1 is largely constituted by a vehicular lower structure 2, an upper revolving structure 4 which is revolvably mounted on the vehicular lower structure 2 through a revolving mechanism 3, and a working mechanism 5 liftably supported at the front of the upper revolving structure 4. In this instance, the vehicular lower structure 2 and the upper revolving structure 4 constitute an automotive vehicle according to the present invention.

Figure 3:
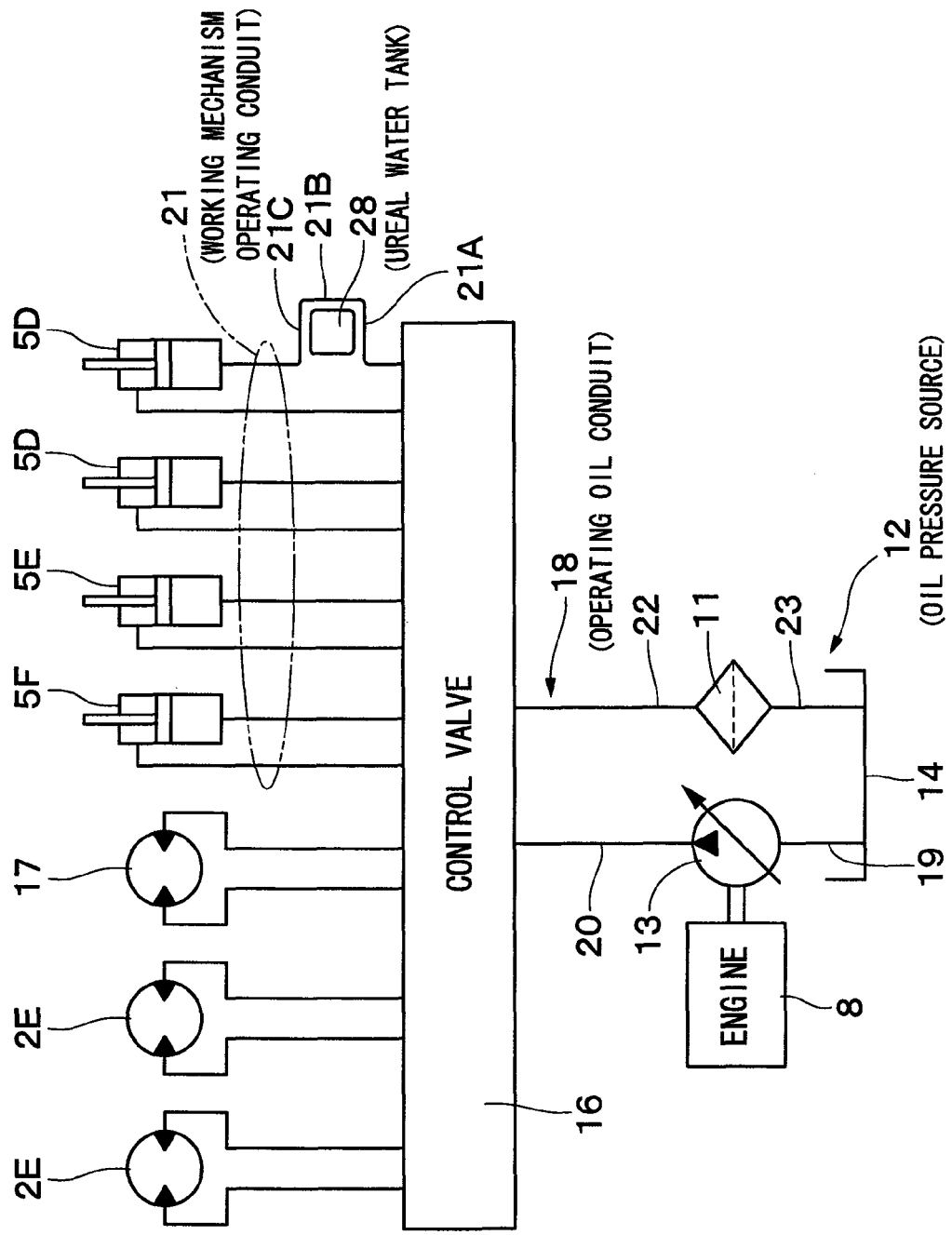
FIG. 3 is a circuit diagram of hydraulic components including hydraulic pump, control valve, actuators and hydraulic piping in the first embodiment.

The vehicular lower structure 2 is largely constituted by a truck frame 2A, right and left drive wheels 2B provided in a rear side of the truck frame 2A, right and left idle wheels 2C provided in a front side of the truck frame 2A, right and left crawler belts 2D (only right ones of the foregoing paired components are shown in the drawing) which are winded around the drive wheels 2B and idle wheels 2C, right and left vehicle drive motors 2E (both of which are shown in FIG. 3) which drive the afore-mentioned drive wheels 2B as an actuator. As pressurized oil is supplied to the vehicle drive motors 2E through motor drive conduits (not shown), the drive wheels 2B are rotatively driven from the vehicle drive motors 2E to turn around the crawler belts 2D.

The working mechanism 5 is composed of a boom 5A having a boom foot portion pivotally supported at a front center position in a front side of a revolving frame 6 which will be described hereinafter, an arm 5B pivotally supported at the fore end of the boom 5A, a bucket 5C pivotally supported at the fore end of the arm 5B, right and left boom cylinders 5D (both of which are shown in FIG. 3) in a role of driving the boom 5A, an arm cylinder 5E in a role of driving the arm 5B, and a bucket cylinder 5F in a role of driving the bucket 5C. The boom cylinders 5D, arm cylinder 5E and bucket cylinder 5F are put in operation as actuators of the hydraulic excavator 1, and are heat sources which elevate the temperature of operating oil.

On the other hand, the upper revolving structure 4 is largely constituted by a revolving frame 6, cab 7, engine 8, radiator 10, oil cooler 11, hydraulic pump 13, operating oil tank 14, fuel tank 15, operating oil conduit 18, post-treatment system 24, ureal water tank 28, which will be described hereinafter.

Figure 2:
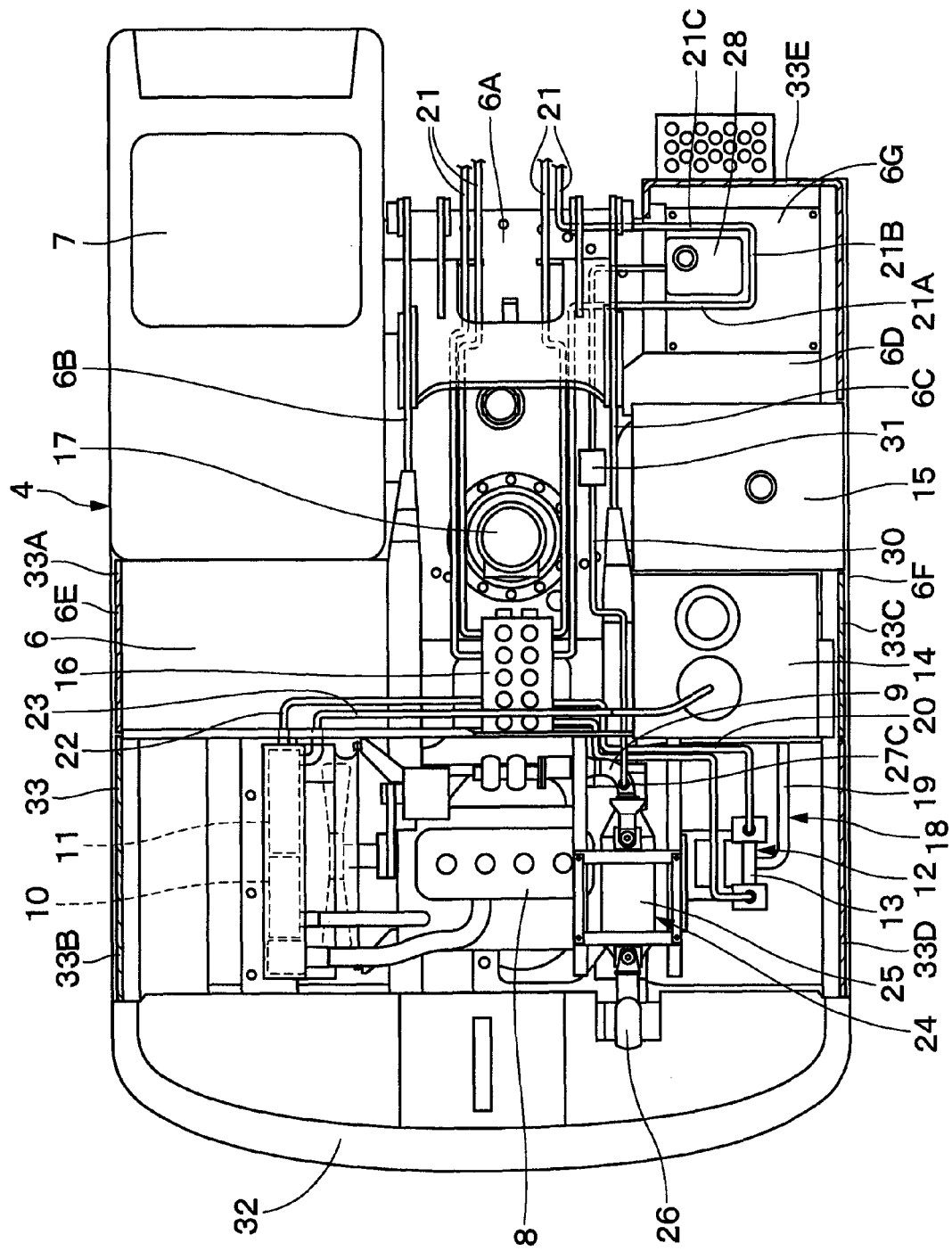
FIG. 2 is a schematic plan view of an upper revolving structure of the excavator, with a housing cover removed to show the inside.

Indicated at 6 is a revolving frame on the upper revolving structure 4, the revolving frame 6 being mounted on the truck frame 2A through a revolving mechanism 3. As shown in FIG. 2, the revolving frame 6 is composed of a thick bottom plate 6A which is extended in forward and rearward directions, a left vertical plate 6B and a right vertical plate 6C which are erected on the bottom plate 6A and extended in forward and rearward directions in laterally spaced relation with each other, a plural number of extension beams 6D which are extended outward from the respective vertical plates 6B and 6C, and a left side frame 6E and a right side frame 6F which are attached to outer ends of the extension beams 6D and extended in forward and rearward directions at laterally outermost positions. Further, a utility room 6G is defined in a right front side position on the revolving frame 6 by the right extension beams 6D and right side frame 6F.

Indicated at 7 is a cab which is mounted on a left front side of the revolving frame 6. This cab 7 is occupied by an operator. An operator's seat to be seated by an operator and various control levers (not shown in the drawings) are provided internally of the cab 7.

Indicated at 8 is an engine which is mounted transversely in a rear side of the revolving frame 6 as a power source. In this case, the engine 8 is a Diesel engine. An exhaust pipe 9 is extended from front side to right side of the engine 8 for discharging engine exhaust gases.

Figure 4:
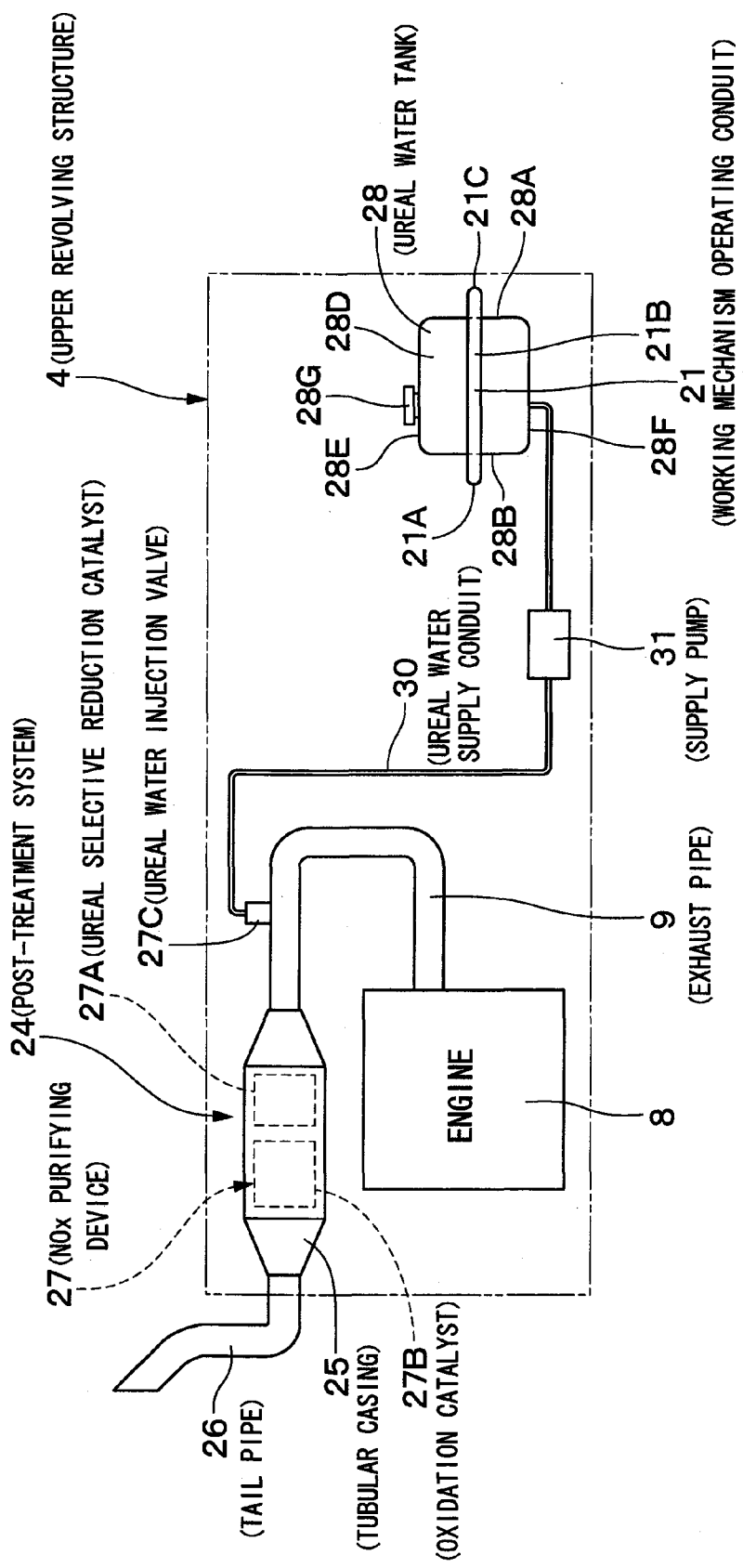
FIG. 4 is a diagrammatic illustration showing arrangement of a post-treatment system along with an engine.

In this instance, the Diesel engine 8 is operative with high efficiency and durability but emits noxious substances such as nitrogen oxides (NOx) and particulate matter (PM) in its exhaust gases. Therefore, a post-treatment system 24, having a NOx purifying device 27 within a tubular casing 25 as shown in FIG. 4, is attached to the exhaust pipe 9 thereby to get rid of emissions of nitrogen oxides (NOx) in engine exhaust gases.

Indicated at 10 is a radiator for cooling down engine cooling water, and at 11 is an oil cooler for cooling down heated operating oil. These radiator 10 and oil cooler 11 are located side by side on the left side of the engine 8.

In this instance, the oil cooler 11 serves to cool down heated operating oil on return from the respective actuators 5D, 5E and 5F of the working mechanism 5 through the control valve 16. For this purpose, the inlet side of the oil cooler 11 is connected to a control valve 16, which will be described hereinafter, through an oil cooler side return conduit 22, while its outlet side is connected to an operating oil tank 14 through a tank side return conduit 23.

On the other hand, indicated at 12 is an oil pressure source which is, as shown in FIG. 3, constituted by a combination of a hydraulic pump 13 and an operating oil tank 14. Namely, the reference numeral 13 denotes a hydraulic pump which is attached to the right side of the engine 8 to constitute an oil pressure source 12 along with an operating oil tank 14. This hydraulic pump 13 is driven by the engine 8 and can serve as a heat source. Further, the inlet side of the hydraulic pump 13 is connected to the operating oil tank 14 through an operating oil supply conduit 19, while its outlet side is connected to the control valve 16 through a pressurized oil supply conduit 20.

Further, indicated at 14 is an operating oil tank which is mounted in a right side section of the revolving frame 6 on the front side of the hydraulic pump 13 to constitute the oil pressure source 12 along with the hydraulic pump 13. This operating oil tank 14 serves as a storage of operating oil to be supplied to the hydraulic pump 13. On the other hand, indicated at 15 is a fuel tank (see FIG. 2) which is located on the front side of the operating oil tank 14, and this fuel tank 15 is serving as a storage of a fuel to be supplied to the engine 8.

Designated at 16 is a control valve which is provided on the revolving frame 6, on the front side of the engine 8. By and through this control valve 16, in response to operations of control levers in the cab 7, pressurized oil from the hydraulic pump 13 is supplied to and from each one of the vehicle drive motors 2E, actuator cylinders 5D, 5E and 5F of the working mechanism 5, and a revolving motor 17 which is described below.

Indicated at 17 is a revolving motor which is provided on the revolving frame 6 at a position on the front side of the control valve 16. This revolving motor 17 constitutes part of the revolving mechanism 3 which puts the upper revolving structure 4 in a revolving motion on the vehicular lower structure 2, and serves as one of actuators.

Now, referring to FIGS. 2 and 3, of various hydraulic oil systems on the hydraulic excavator 1, a description is given below on an operating oil conduit 18 which is connected with the respective cylinders 5D, 5E and 5F of the working mechanism 5. This operating oil conduit 18 is connected with the vehicle drive motors 2E of the vehicular lower structure 2, the respective cylinders 5D, 5E and 5F of the working mechanism 5, oil cooler 11, hydraulic pump 13, operating oil tank 14, control valve 16 and revolving motor 17 for circulation of operating oil.

Namely, the operating oil conduit 18 includes a plural number of conduits through which operating oil (pressurized oil or return oil) is circulated in the order as described below. In this instance, the operating oil conduit 18 is largely constituted by an operating oil supply conduit 19 in a role of supplying operating oil from the operating oil tank 14 to the hydraulic pump 13, a pressurized oil supply conduit 20 in a role of supplying pressurized oil from the hydraulic pump 13 to the control valve 16, working mechanism operating conduit 21 in a role of conducting pressurized oil or return oil between each one of the boom cylinder 5D, arm cylinder 5E and bucket cylinder 5F of the working mechanism 5 and the control valve 16, an oil cooler side return conduit 22 in a role of circulating return oil from the control valve 16 to the oil cooler 11, and a tank side return conduit 23 in a role of circulating cooled return oil from the oil cooler 11 to the operating oil tank 14. A description on the conduit between the control valve 16, vehicle drive motor 2E and revolving motor 17 is omitted here although it is shown in the drawing.

The above-mentioned operating oil conduit 18 releases heat to the outside as a result of circulation of operating oil and the temperature of the ureal water has been elevated to a higher level by released heat. Thus, this hot operating oil can be utilized as a heat source of a constant heat value. Further, generally the operating oil conduit 18 is formed of a combination of metal conduits and joints, so that it can be located at an arbitrary position on the revolving frame 6 with a high degree of freedom with respect to pipe angle and bending.

Now, described below by way of example is a first embodiment in which, among various working mechanism operating conduits 21 to and from the actuators 5D, 5E and 5F, a working mechanism operating conduit 21 from one of the boom cylinders 5D is arranged around the ureal water tank 28.

Figure 5:
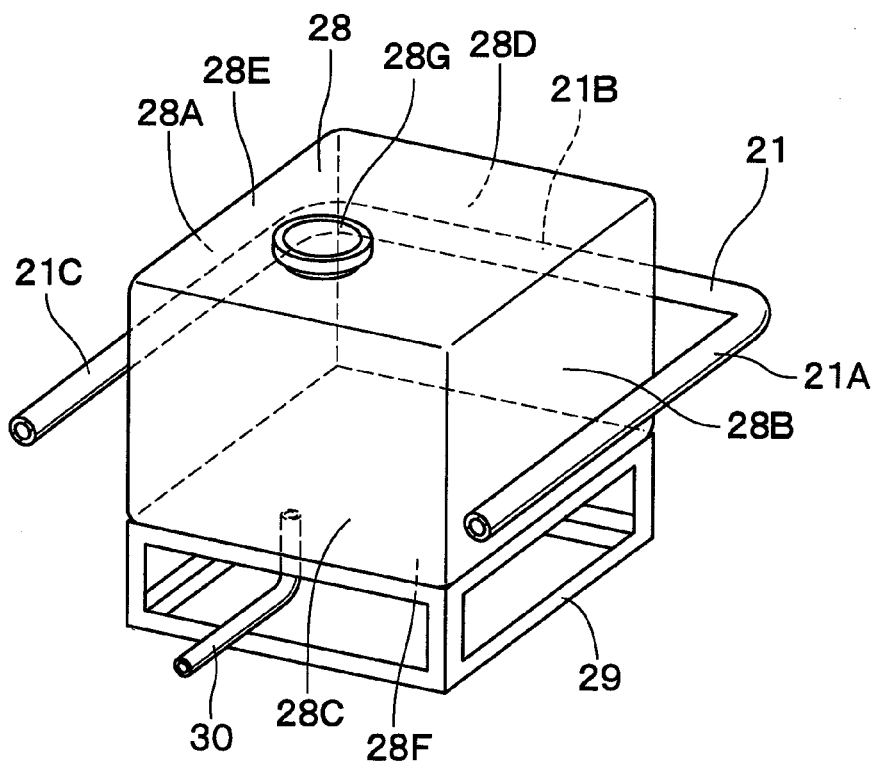
FIG. 5 is a schematic perspective view on an enlarged scale of a ureal water tank having enfolded therearound with working mechanism operating conduit.

Namely, in the first embodiment, the ureal water tank 28 is kept in a heated state to prevent coagulation of an aqueous urea solution by the use of one of working mechanism operating conduits 21 which is connected between the control valve 16 and one boom cylinder 5D for supplying and discharging operating oil to and from the latter. One end of this working mechanism operating conduit 21 is connected to the control valve 16, while the other end is connected to one boom cylinder 5D of the working mechanism 5. Further, one working mechanism operating conduits 21 of a pair of the working mechanism operating conduits 21 is folded in U-shape on its way along the ureal water tank 28 on a right front section of the revolving frame 6 as shown in FIGS. 2, 3 and 5.

More particularly, a working mechanism operating conduit 21 is composed of a rear conduit section 21A extending in a rightward direction along a tank surface at the rear side surface 28B of the ureal water tank 28, a right conduit section 21B extending in a forward direction along a tank surface at the right side surface 28D of the ureal water tank 28, and a front conduit section 21C extending in a leftward direction along a tank surface at the front side surface 28A of the ureal water tank 28. This pipe arrangement makes it possible to route the respective conduit sections 21A, 21B and 21C along side surfaces 28B, 28D and 28A of the ureal water tank 28, even in case the ureal water tank 28 is located in the utility room 6G in a right front section of the revolving frame 6, which can be readily accessible at the time of refilling the ureal water tank 28. The ureal water tank 28 is enclosed by the respective conduit sections 21A, 21B and 21C from a close distance, so that the aqueous urea solution in the ureal water tank 28 can be uniformly heated from around by hot pressure oil in circulation through the respective conduit sections 21A, 21B and 21C.

Now, described below is a post-treatment system 24 which is connected on the exhaust pipe 9 of the engine 8 as an exhaust gas depurator as shown in FIGS. 2 and 4.

Namely, built into the post-treatment system 24 is a NOx purifying device 27, which will be described hereinafter, for purifying NOx in engine exhaust gases by the use of an aqueous urea solution. The post-treatment system 24 is largely constituted by a tubular casing 25 and a NOx purifying device 27, as described below.

Indicated at 25 is a tubular casing of the post-treatment system 24, the tubular casing 25 being in the form of a hollow tube which is extended in forward and rearward directions. Packed in the tubular casing 25 is a urea selective reduction catalyst 27A of the NOx purifying device 27, along with an oxidation catalyst 27B. The tubular casing 25 is connected to the engine exhaust pipe 9 of the engine 8 at its fore end, and to a tail pipe 26 at its rear end.

Denoted at 27 is a NOx purifying device which is accommodated in the tubular casing 25. The NOx purifying device 27 plays a role of depurating nitrogen oxides (NOx) in engine exhaust gases by the use of an aqueous urea solution. Further, the NOx purifying device 27 is largely constituted by a urea selective reduction catalyst 27A which is accommodated, for example, in an upstream side of the tubular casing 25, an oxidation catalyst 27B which is located on the downstream side of the urea selective reduction catalyst 27A, and a ureal water injection valve 27C which is provided, for example, in the exhaust pipe 9 on the upstream side of the urea selective reduction catalyst 27A. Further the ureal water injection valve 27C is connected to the ureal water tank 28 through a ureal water supply conduit 30 and a supply pump 31, which will be described hereinafter.

In this instance, the NOx purifying device 27 is adapted to inject an aqueous urea solution into exhaust gases from the ureal water injection valve 27C and to decompose NOx in engine exhaust gases into water and nitrogen through a reducing reaction by the use of ammonia which is generated from the aqueous urea solution by the urea selective reduction catalyst 27A. Then, the exhaust gas is treated with the oxidation catalyst 27B to decrease the ammonia content in engine exhaust gases.

Further, the ureal water tank 28, a storage of an aqueous urea solution to be injected into the exhaust gas on the upstream side of the urea selective reduction catalyst 27A of the NOx purifying device 27, is arranged in the manner as described below.

The ureal water tank 28 is fixedly set in position within the utility room 6G of the revolving frame 6, for example, through a mount frame 29. Moreover the ureal water tank 28 is connected with the ureal water injection valve 27C through a ureal water supply conduit 30 and a supply pump 31. Further the ureal water tank 28 is in the form of a polyhedral container (e.g., a hexahedral container) which is composed of various sides.

Namely, as shown in FIG. 5, an exterior surface of the ureal water tank 28 is in the form of a closed hexahedral container having a front side surface 28A, a rear side surface 28B, a left side surface 28C, a right side surface 28D, an upper side surface 28E and a lower side surface 28F. A cap 28G is put on the upper side surface 28E, and the ureal water supply conduit 30 is connected to the lower side surface 28F. Further, a front conduit section 21C of the working mechanism operating conduit 21 is positioned as to run along the front side surface 28A, a rear conduit section 21A is positioned as to run along the rear side surface 28B, and a right conduit section 21B is positioned as to run along the right side surface 28D of the ureal water tank 28.

In this instance, the ureal water tank 28 is set in the utility room 6G in a right front side section of the swing frame 6, i.e., in a place which is easily accessible from outside and usually used as a tool box room. The utility room can be accessible simply by opening a front cover portion 33E of a housing cover 33, which will be described hereinafter, permitting to carry out various jobs in a facilitated manner, including a tank refilling job, inspection and maintenance and service work. On the other hand, there is no heat source component like an engine 8 in the utility room 6G. Therefore, if the ambient temperature drop to a level around −11° C., coagulation would occur to the aqueous urea solution, and it would become difficult to feed the urea solution to the NOx purifiying device 27.

However, even if there is no heat source in the environs, the ureal water tank 28 can be heated from around by the use of the heat of radiated from operating oil (pressurized oil or return oil), by changing the route of the working mechanism operating conduit 21 in such a way as to enclose the ureal water tank 28.

Indicated at 32 is a counterweight which is attached to a rear end of the revolving frame 6 on the rear side of the engine 8. This counterweight 32 works as a weight balance relative to the working mechanism 5.

Denoted at 33 is a housing cover which is built on the revolving frame 6 for housing the engine 8, control valve 16 and ureal water tank 28. This housing cover 33 includes a plural number of openable side cover portions 33A to 33D which covered both sides can be opened to uncover, and a front cover portion 33E positioned in the right forward portion which openably and closacly cover the ureal water tank 28 and the like.

Being arranged as described above, the hydraulic excavator 1 of the first embodiment is put in operation in the manner as follows.

In the first place, an operator gets into the cab 7 on the upper revolving structure 4 and starts the engine 8 to put the hydraulic pump 13 in operation. Whereupon, operating oil in the operating oil tank 14 is supplied to the hydraulic pump 13 through the operating oil supply conduit 19 of the operating oil conduit 18, and pressurized oil which is discharged from the hydraulic pump 13 is supplied to the control valve 16 through the pressurized oil supply conduit 20. A vehicle drive control lever in the cab 7 is manually shifted by the operator to supply pressurized oil to the vehicle drive motors 2E from the control valve 16 to drive the vehicular lower structure 2 in a forward or reverse position. On the other hand, when working mechanism control levers are manipulated by the operator, pressurized oil is supplied to the respective cylinders 5D, 5E and 5F of the working mechanism 5 from the control valve 16 through the working mechanism operating conduits 21 to lift up and down the working mechanism 5 to carry out a ground excavation work.

Return oil which is returned to the control valve 16 from the vehicular lower structure 2 and the working mechanism 5 is elevated in temperature by the heat which is generated by operation of the cylinders 5D, 5E or 5F, and therefore fed to the oil cooler 11 through the oil cooler side return conduit 22 for cooling purposes. Operating oil which has been cooled down at the oil cooler 11 is returned to the operating oil tank 14 through the tank side return conduit 23.

Further, when the engine 8 is in operation, emissions of nitrogen oxides (NOx) occur in the exhaust pipe 9. Therefore, an aqueous urea solution in the ureal water tank 28 is fed to the ureal water injection valve 27C of the NOx purifying device 27 by the supply pump 31 through the ureal water supply conduit 30. Thus, the aqueous urea solution is injected into engine exhaust gases from the ureal water injection valve 27C of the NOx purifying device 27 to generate ammonia. As a result, nitrogen oxides are reduced and decomposed into water and nitrogen by the urea selective reduction catalyst 27A. And, the exhaust gas is then discharged to the outside through the oxidation catalyst 27B.

Moreover, at a working site in a cold district where the outside air temperature gets below −10° C., for example, coagulation (freeze) may occur to an aqueous urea solution in the ureal water tank 28, rendering the deputation of exhaust gases by the NOx purifying device 27 infeasible. However, by circulation of hot operating oil (pressurized oil or return oil) through the working mechanism operating conduit 21 which is enfolded around the ureal water tank 28, the aqueous urea solution in the tank 28 is directly heated and kept in a liquid state.

Thus, according to the first embodiment, the ureal water tank 28, which is a storage of the aqueous ureal solution, is installed in the utility room 6G in a right front side section on the revolving frame 6, which is readily accessible from outside. Furthermore, a working mechanism operating conduit 21 of the operating oil conduit 18, which supplies operating oil to and from a boom cylinder 5D of the working mechanism 5, is routed to run along exterior surfaces of the ureal water tank 28. Thus, even if no heat source component exists in the environs of the ureal water tank 28, the ureal water tank 28 can be heated from around in a hot state by the heat which is radiated from the operating oil (pressurized oil or return oil) in circulation through the working mechanism operating conduit 21.

Thus, even in an operation in a cold district, the aqueous urea solution in the ureal water tank 28 is heated by the operating oil in circulation through the working mechanism operating conduit 21, preventing coagulation of the aqueous urea solution which might otherwise be caused by a temperature drop, thus enhancing the reliability of the NOx purifying device 27. Besides, the ureal water tank 28 is placed in the utility room 6G on the revolving frame 6, which is readily accessible from outside, to facilitate a tank refilling job and maintenance work as well.

Further, the operating oil in circulation through the working mechanism operating conduit 21 repeatedly undergoes a temperature increase by pressurization and a temperature drop by the cooling effects of the oil cooler 11, within a certain temperature range. That is to say, the aqueous urea solution in the ureal water tank 28 can be kept in a certain temperature range in an extremely simplified manner by utilization of the heat of operating oil running through the working mechanism operating conduit 21, without necessitating a highly developed temperature control.

On the other hand, the working mechanism operating conduit 21 is provided with a folded rear conduit section 21A, right conduit 21B and front conduit section 21C of U-shape within its length, the folded respective conduit sections 21A, 21B and 21C being arranged to run along the rear side surface 28B, right side surface 28D and front side surface 28A of the ureal water tank 28. Thus, heat is applied to the ureal water tank 28 from three side surfaces 28A, 28B and 28D to keep the inside aqueous urea solution in a uniformly heated state.

Further, since the ureal water tank 28 is located in the utility room 6G in a right front side section of the revolving frame 6, the aqueous urea solution in the ureal water tank 28 can be heated simply by routing and enfolding a working mechanism operating conduit 21 to or from the working mechanism 5, producing sufficient heating effects by a simple pipe arrangement.

Figure 6:
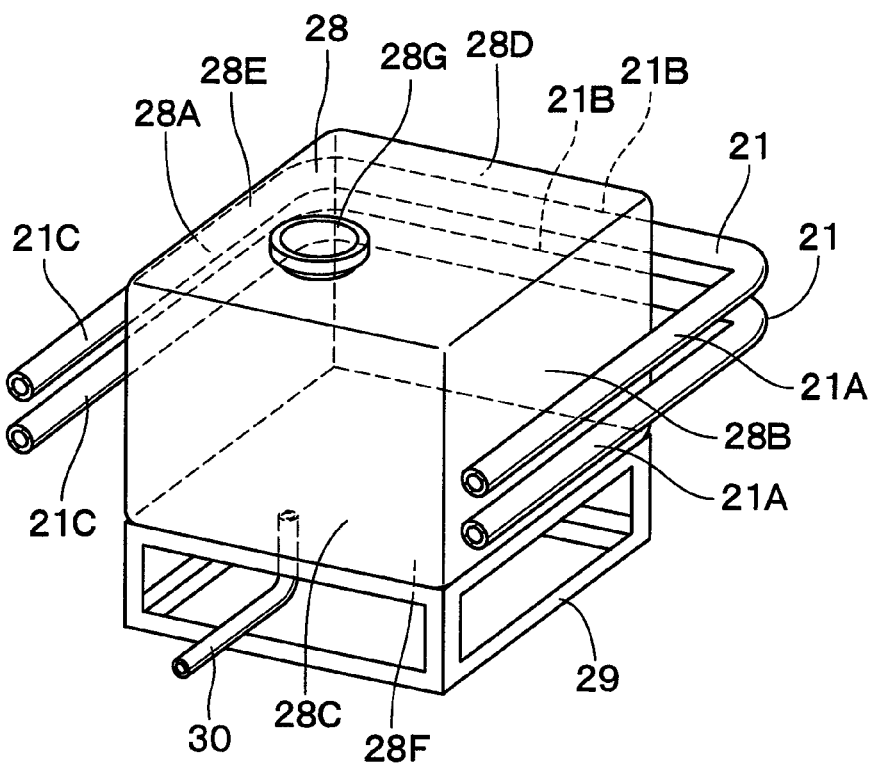
FIG. 6 is a schematic perspective view on an enlarged scale of a ureal water tank having enfolded therearound with working mechanism operating conduit in a first modification according to the present invention.

In the first embodiment, of the two working mechanism operating conduits 21 which are connected between the boom cylinders 5D and the control valve 16, byway of example one working mechanism operating conduit 21 is arranged to run along lateral surfaces of the ureal water tank 28. However, needless to say, the present invention is not limited to the example shown. For instance, as in a first modification shown in FIG. 6, a couple of working mechanism operating conduits 21 may be arranged to run along exterior surfaces of the ureal water tank 28 to heat the latter at a higher speed.

Figure 7:
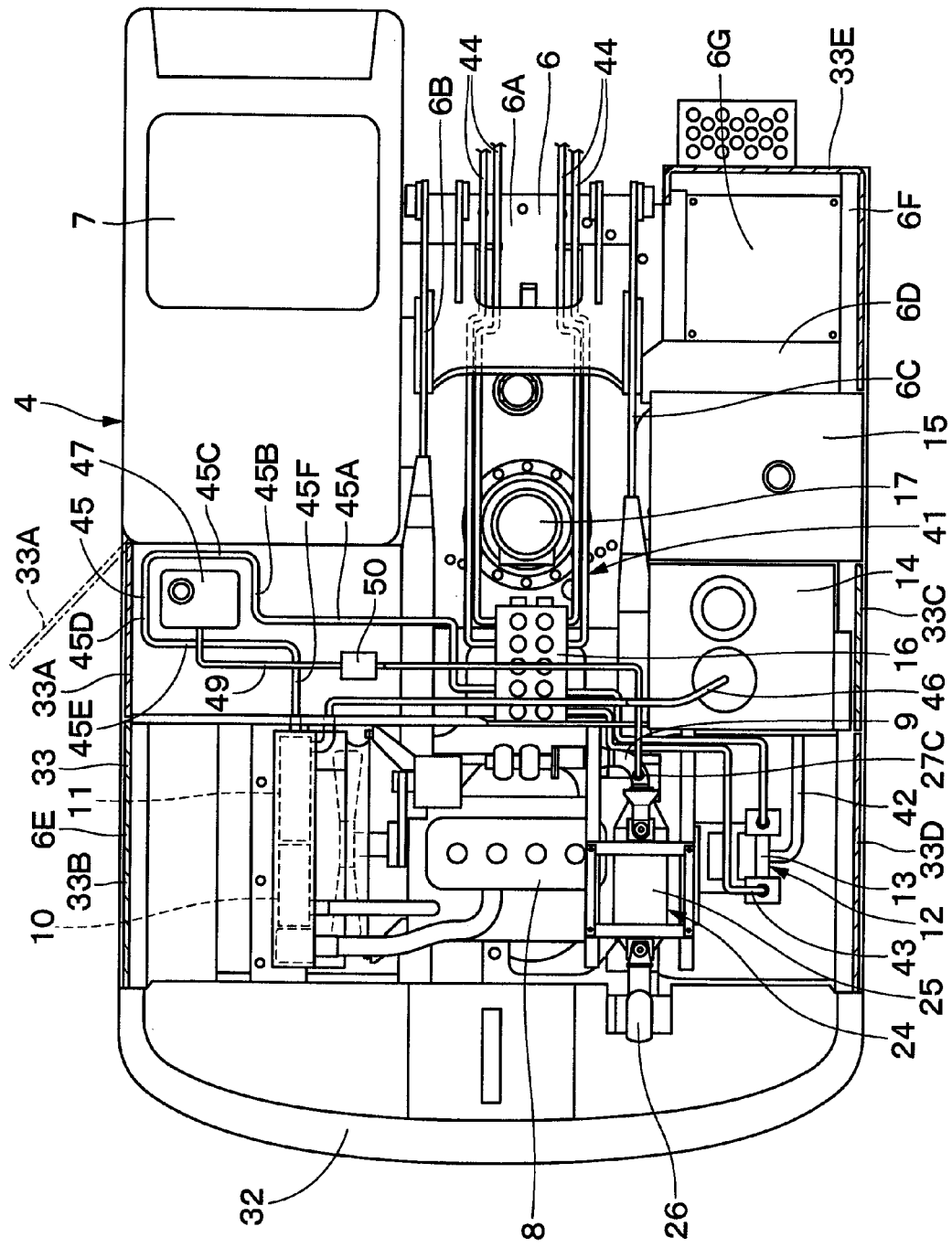
FIG. 7 is a schematic plan view of an upper revolving structure in a second embodiment of the invention, with a housing cover removed to show the inside.
Figure 8:
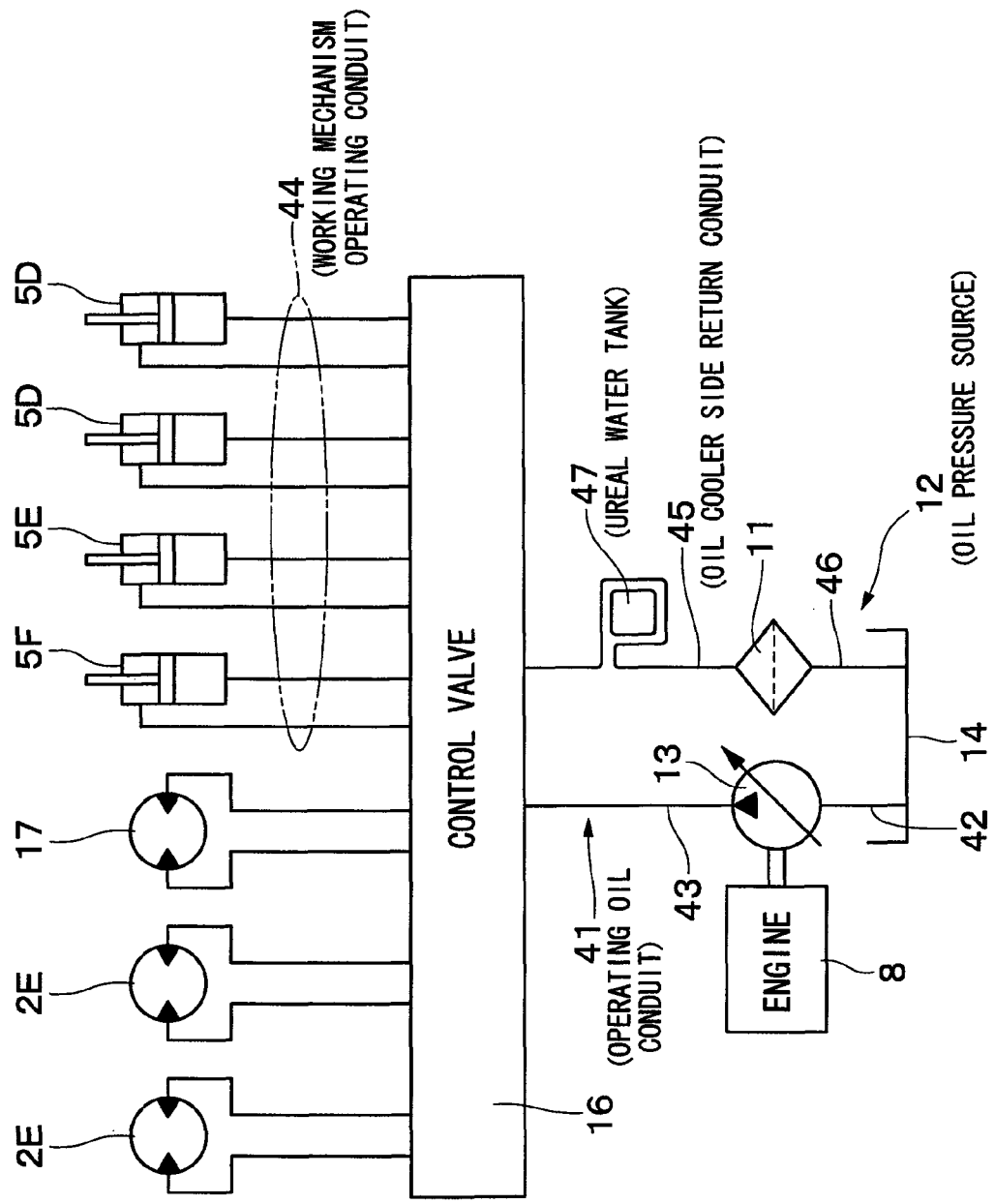
FIG. 8 is a circuit diagram of a hydraulic system including hydraulic pump, control valve, actuators and various hydraulic conduits in the second embodiment.
Figure 9:
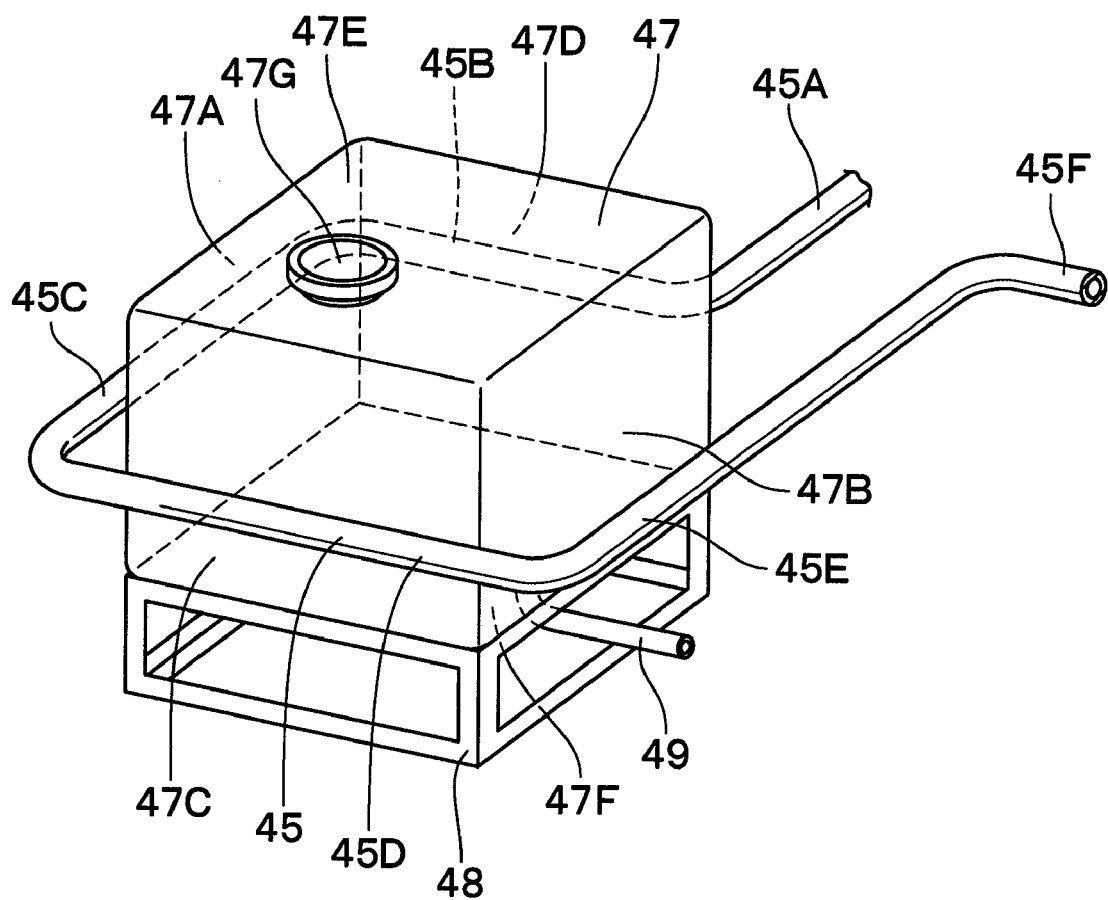
FIG. 9 is a schematic perspective view on an enlarged scale of a ureal water tank having enfolded therearound with an oil cooler side return conduit.

Now, turning to FIGS. 7 through 9, there is shown an automotive construction machine according to a second embodiment of the invention. This embodiment has a feature in that an oil cooler side return conduit between a control valve and an oil cooler is arranged to run along four lateral sides of a ureal water tank. In the following description of the second embodiment, those component parts which are identical with a counterpart in the foregoing first embodiment are simply designated by the same reference numeral or character to avoid repetitions of similar explanations.

Indicated at 41 is an operating oil conduit adopted in the second embodiment. Substantially in the same manner as the operating oil conduit 18 in the first embodiment, this operating oil conduit 41 is largely constituted by an operating oil supply conduit 42 for supplying operating oil from an operating oil tank 14 to a hydraulic pump 13, a pressurized oil supply conduit 43 for supplying pressurized oil from the hydraulic pump 13 to a control valve 16, a working mechanism operating conduit 44 connected between the control valve 16 and a working mechanism 5 for supplying operating oil to and from the respective cylinders 5D, 5E and 5F, an oil cooler side return conduit 45 for circulation of return oil from the control valve 16 to an oil cooler 11, and a tank side return conduit 46 for returning cooled return oil from the oil cooler 11 to an operating oil tank 14.

However, the operating oil conduit 41 of the second embodiment differs from the operating oil conduit 18 in the first embodiment in that the oil cooler side return conduit 45 is routed around a ureal water tank 47, which will be described hereinafter, to serve as a heater conduit.

As shown in FIG. 8, the oil cooler side return conduit 45 is connected to the control valve 16 at its one end, and to an inlet side of the oil cooler 11 at the other end. In a space between a cab 7 and an engine 8 (the oil cooler 11), the oil cooler side return conduit 45 is bent into a square shape in such a way as to substantially enclose four lateral sides of a ureal water tank 47 in four conduit sections.

More specifically, as shown in FIG. 7, the oil cooler side return conduit 45 intersect the left vertical plate 6B of the revolving frame 6, and the conduit is arranged to include a control valve side conduit section 45A which is extended from a control valve 16 toward the ureal water tank 47 along the rear side of the cab 7, a right conduit section 45B which is bent forward the cab 7 at a fore end of the control valve side conduit section 45A, a front conduit section 45C which is bent leftward along the rear side of the cab 7 at a fore end of the right conduit section 45B, a left conduit section 45D which is bent rearward along a side cover portion 33A of a housing cover 33 at a fore end of the front conduit section 45C, a rear conduit section 45E which is bent rightward at a fore end of the left conduit section 45D at a position beyond a ureal water tank 47, and an oil cooler side conduit section 45F which is bent toward the oil cooler 11 at a fore end of the rear conduit section 45E.

As shown in FIG. 9, the oil cooler side return conduit 45 is arranged to enfold the ureal water tank 47 by locating its right conduit section 45B to run along right side surface 47D of the ureal water tank 47, front conduit section 45C to run along front side surface 47B of the ureal water tank 47, left conduit section 45D to run along left side surface 47C of the ureal water tank 47 and rear conduit section 45E to run along rear side surface 47B of the ureal water tank 47. Thus, the oil cooler side return conduit 45 can heat the aqueous urea solution in the ureal water tank 47 uniformly from four sides 47A, 47B, 47C and 47D thereof.

Indicated at 47 is a ureal water tank which is adopted in the second embodiment. This ureal water tank 47 is located in a so-called utility room which is located between cab 7 and engine 8 (oil cooler 11) in an outmost (leftmost) side section which is readily accessible from outside at the time of refilling. The ureal water tank 47 is fixedly set in position, for example, on a mount frame 48, and connected to a ureal water injection valve 27C through a ureal water supply conduit 49 and a supply pump 50.

Substantially in the same way as the ureal water tank 28 in the foregoing first embodiment, a surface of the ureal water tank 47 is in the form of a closed hexahedral container including front side surface 47A, rear side surface 47B, left side surface 47C, right side surface 47D, upper side surface 47E and lower side surface 47F. A cap 47G is put on the upper side surface 47E of the tank 47. The ureal water tank 47 is folded by the front conduit section 45C of the oil cooler side return conduit 45 which is positioned to run along the front side surface 47A, rear conduit section 45E which is positioned to run along the rear side surface 47B, left conduit section 45D which is positioned to run along the left side surface 47C, and right conduit section 45B which is positioned to run along the right side surface 47D.

Being arranged as described above, the second embodiment of the invention can produce substantially the same effects as the foregoing first embodiment. Especially in the second embodiment, the oil cooler side return conduit 45 extending toward the oil cooler 11 from the control valve 16 is used as an operating oil conduit 41 to be routed along exterior surfaces of the ureal water tank 47 for heating an aqueous urea solution in the ureal water tank 47. When refilling an aqueous urea solution, the ureal water tank 47 can be accessed simply by opening the side cover portion 33A of the housing cover 33 as indicated by two-dot chain line in FIG. 7.

Besides, the oil cooler side return pipe 45 is formed with respective conduit sections 45B, 45C, 45D and 45E within its length, which are positioned in such a way as to enclose the ureal water tank 47 from four sides. More specifically, the respective conduit sections 45B, 45C, 45D and 45E are arranged to run along exterior surfaces of right side 47D, front side 47A, left side 47C and rear side 47B of the ureal water tank 47. Thus, of exterior surfaces of the ureal water tank 47, heat can be applied from exterior surfaces of the four sides 47A, 47B, 47C and 47D to uniformly warm the aqueous urea solution.

Figure 10:
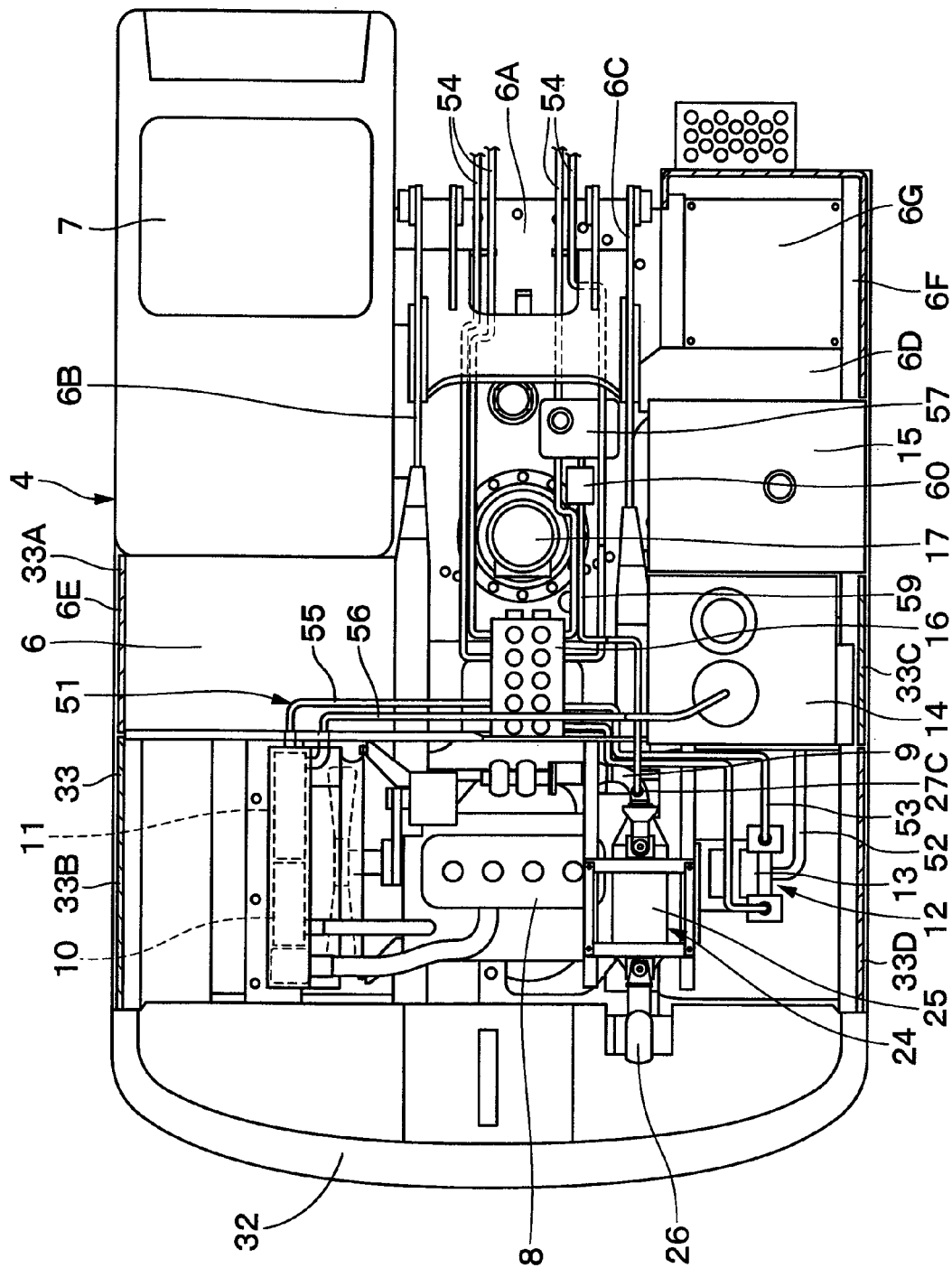
FIG. 10 is a schematic plan view of an upper revolving structure in a third embodiment of the present invention, with a housing cover removed to show the inside.
Figure 11:
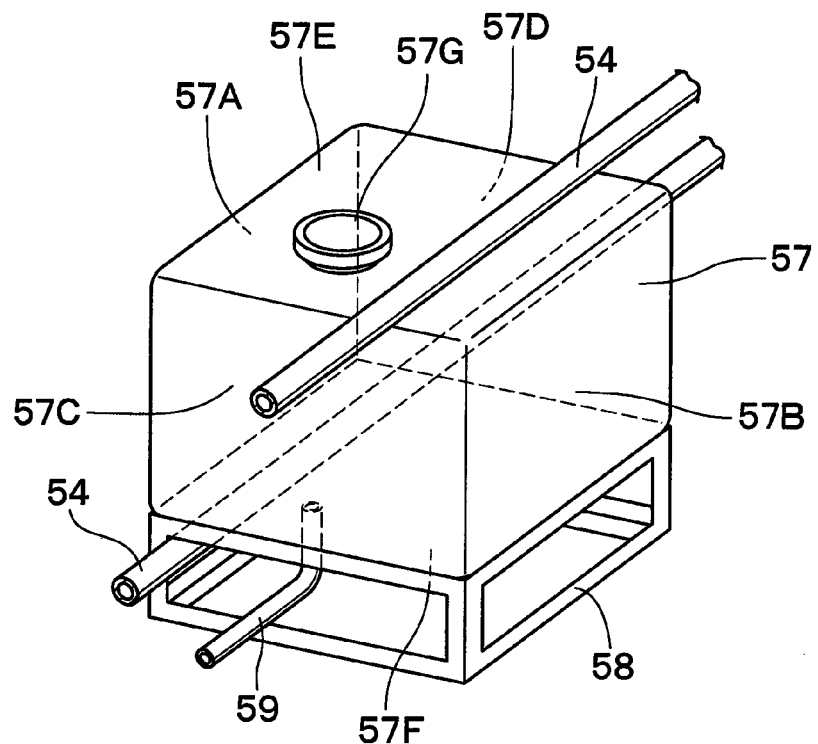
FIG. 11 is a schematic perspective view on an enlarged scale of a ureal water tank having enfolded therearound with a couple of working mechanism operating conduits.

Now, turning to FIGS. 10 and 11, there is shown a third embodiment of the invention. This embodiment has a feature in that a ureal water tank is located in the vicinity of a swing motor, and a couple of working mechanism operating conduits, which are connected between a control valve and a boom cylinder of a working mechanism, are arranged to run along upper and lower sides of the ureal water tank. In the following description of the third embodiment, those component parts which are identical with a counterpart in the foregoing first embodiment are simply designated by the same reference numeral or character to avoid repetitions of similar explanations.

Indicated at 51 is an operating oil conduit in the third embodiment. Similarly to the operation oil conduit 18 in the first embodiment, the operating oil conduit 51 is largely constituted by an operating oil supply conduit 52, a pressurized oil supply conduit 53, a working mechanism operating conduit 54, an oil cooler side return conduit 55, and a tank side return conduit 56.

Denoted at 57 is a ureal water tank adopted in the third embodiment. Substantially in the same way as the ureal water tank 28 in the first embodiment, this ureal water tank 57 is formed in the shape of a closed hexahedral container having front side surface 57A, rear side surface 57B, left side surface 57C, right side surface 57D, upper side surface 57E and lower side surface 57F. A cap 57G is fitted on said upper side surfaces 57E. Further, the ureal water tank 57 is fixedly set in position on a mount frame 58, and connected to a ureal water injection valve 27C through a ureal water supply conduit 59 and a supply pump 60.

The operating oil conduit 51 in the third embodiment differs from the operating oil conduit 18 of the first embodiment in that a couple of working mechanism operating conduits 54 are used as heater conduits for heating the ureal water tank 57.

Each one of the two working mechanism operating conduits 54 is connected to the control valve 16 at one end thereof, and to a boom cylinder 5D of a working mechanism 5 at the other end through left and right vertical plates 6B and 6C of a revolving frame 6. The two working mechanism operating conduits 54 are located in vertically different positions relative to each other. Namely, one of the two working mechanism operating conduits 54 is arranged to run along a route at a higher level and the other working mechanism operating conduit 54 is arranged to run along a route at a lower level. Thus, as shown in FIG. 11, one working mechanism operating conduit 54 is arranged to run along the upper side surface 57E of the ureal water tank 57, while the other working mechanism operating conduit 54 is arranged to run along the lower side surface 57F of the ureal water tank 57. Thus, the two working mechanism operating conduits 54 are arranged to embrace the upper and lower side surfaces 57E and 57F the ureal water tank 57 to heat an aqueous urea solution uniformly.

Being arranged as described above, the third embodiment of the invention can produce substantially the same effects as the foregoing first embodiment. Especially in the third embodiment, an aqueous urea solution can be heated uniformly from upper and lower sides by the two working mechanism operating conduits 54 which are arranged to along the top and lower sides of the ureal water tank 57.

Figure 12:
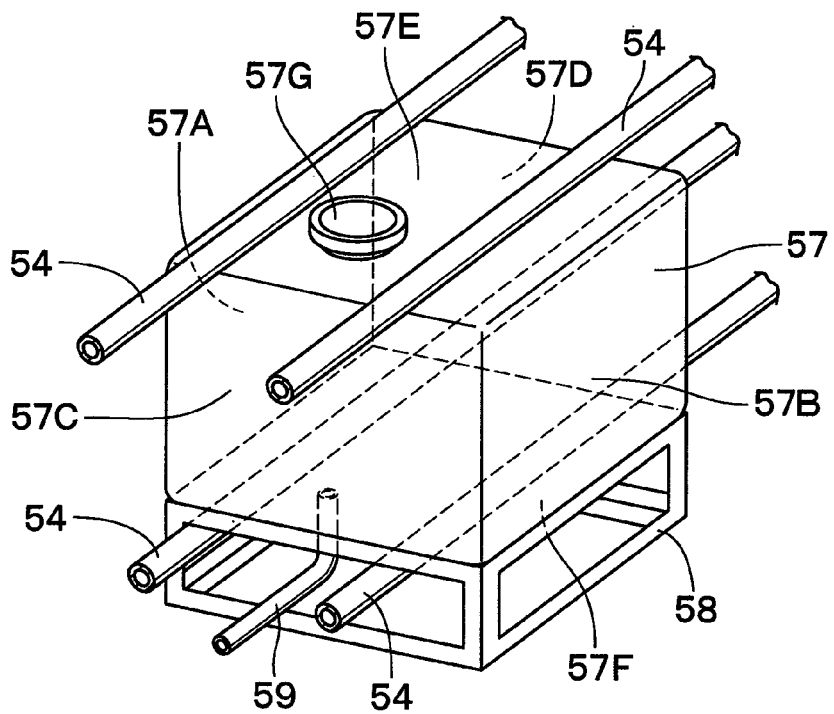
FIG. 12 is a schematic perspective view on an enlarged scale of a ureal water tank and working mechanism operating conduits in a second modification according to the present invention.

Further, in the third embodiment, by way of example, one of two working mechanism operating conduits 54, which are connected between the control valve 16 and boom cylinders 5D, is arranged to run along an upper side surface 57E of the ureal water tank 57, while the other working mechanism operating conduit 54 is arranged to run along a lower side surface 57F of the ureal water tank 57. However, the present invention is not limited to this particular example shown. For instance, as in a second modification of FIG. 12, there may be employed four working mechanism operating conduits 54 to run along exterior surface of the ureal water tank 57 in total, routing two working mechanism operating conduits 54 to run along an upper side surface 57E of a ureal water tank 57, while routing the other two working mechanism operating conduits 54 to run along a lower side surface 57F of the ureal water tank 57.

Figure 13:
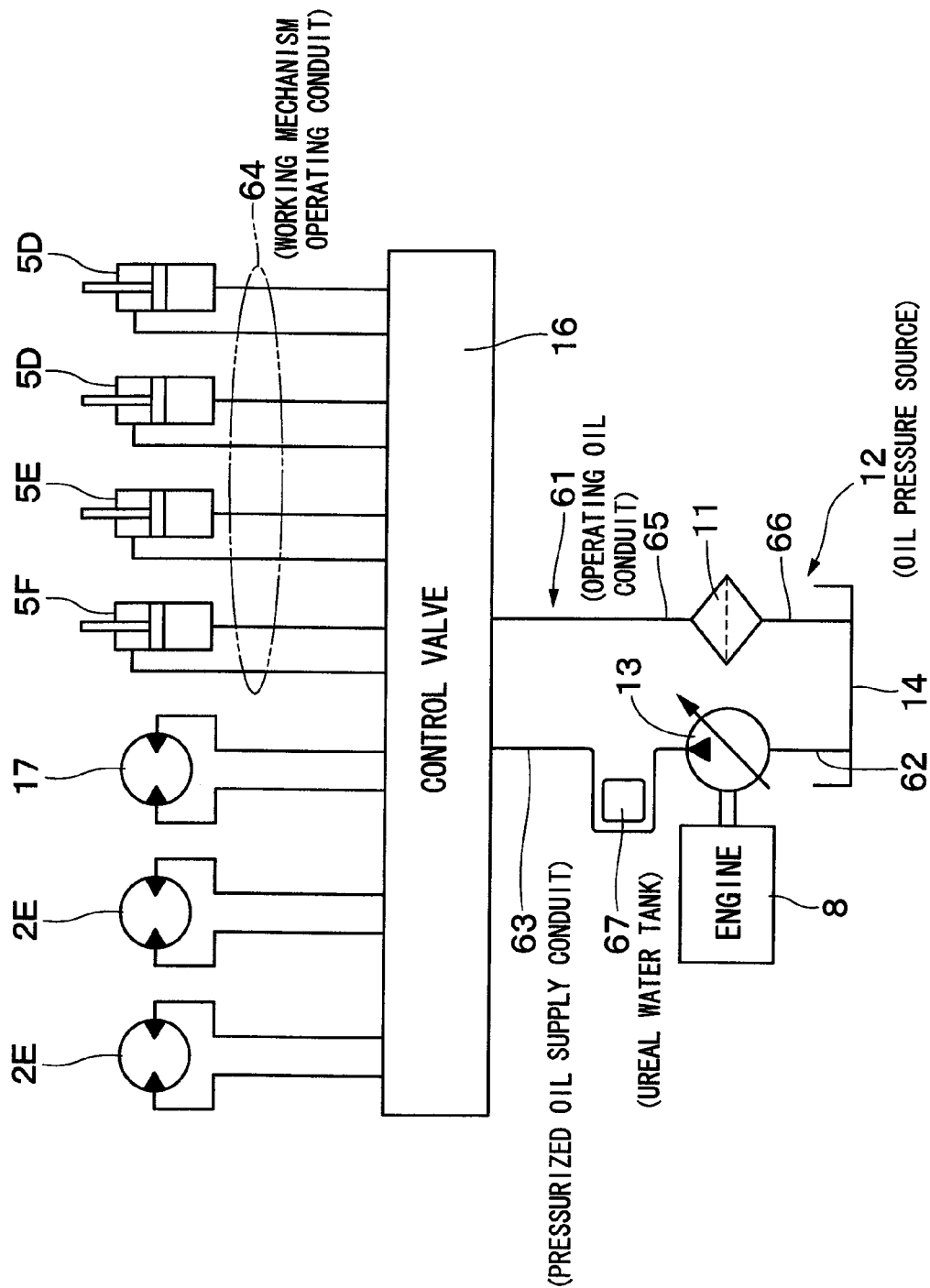
FIG. 13 is a circuit diagram of a hydraulic system including hydraulic pump, control valve, actuators and various conduits in a fourth embodiment of the present invention.

Now, turning to FIG. 13, there is shown a fourth embodiment of the automotive construction machine according to the invention. This embodiment has a feature in that, a pressurized oil supply conduit, which is connected between a hydraulic pump and a control valve, is arranged to run along exterior surfaces of a ureal water tank. In the following description of the fourth embodiment, those component parts which are identical with a counterpart in the foregoing first embodiment are simply designated by the same reference numeral or character to avoid repetitions of similar explanations.

Indicated at 61 is an operating oil conduit in the fourth embodiment. Substantially in the same way as the operating oil conduit 18 in the first embodiment, the operating oil conduit 61 is largely constituted by an operating oil supply conduit 62, a pressurized oil supply conduit 63, working mechanism operating conduits 64, an oil cooler side return conduit 65 and a tank side return conduit 66. Denoted at 67 is a ureal water tank. Besides this ureal water tank 67 is in the form of a closed hexahedral container similar to the ureal water tank 28 in the first embodiment.

The operating oil conduit 61 in the fourth embodiment differs from the operating oil conduit 18 in the first embodiment in that the pressurized oil supply conduit 63 is used for heating the ureal water tank 67.

One end of the pressurized oil supply conduit 63 is connected to the hydraulic pump 13, while the other end is connected to the control valve 16. The pressurized oil supply conduit 63 is bent, for example, in U-shape to fold in exterior surfaces of the ureal water tank 67. Thus, the pressurized oil supply conduit 63 can heat an aqueous urea solution in the ureal water tank 67 uniformly, for example, from three lateral sides of the ureal water tank 67 by the use of heat of pressurized oil which is in supply from the hydraulic pump 13 to the control valve 16.

Being arranged as described above, the fourth embodiment can produce substantially the same effects as the foregoing first embodiment. Especially in the fourth embodiment, the pressurized oil supply conduit 63, which connects the hydraulic pump 13 with the control valve 16, is arranged to run along exterior surfaces of the ureal water tank 67. Thus, an aqueous urea solution in the ureal water tank 67 can be heated by the heat of pressurized oil in circulation between the hydraulic pump 13 and control valve 16.

In the above-described first embodiment, by way of example, the working mechanism operating conduit 21 which is connected to a boom cylinder 5D is used for heating the ureal water tank 28. However, needless to say, the present invention is not limited to this particular example. For instance, the ureal water tank 28 may be heated by the use of other working mechanism operating conduit 21 which is connected with the arm cylinder 5E or with the bucket cylinder 5F.

Further, in the first embodiment, by way of example, part of the working mechanism operating oil conduit 21 is bent in U-shape to provide the rear conduit section 21A, right conduit section 21B and front conduit section 21C, and these rear conduit section 21A, right conduit section 21B and front conduit section 21C run along exterior surfaces at the rear side surface 28B, right side surface 28D and front side surface 28A of the ureal water tank 28, respectively.

Figure 14:
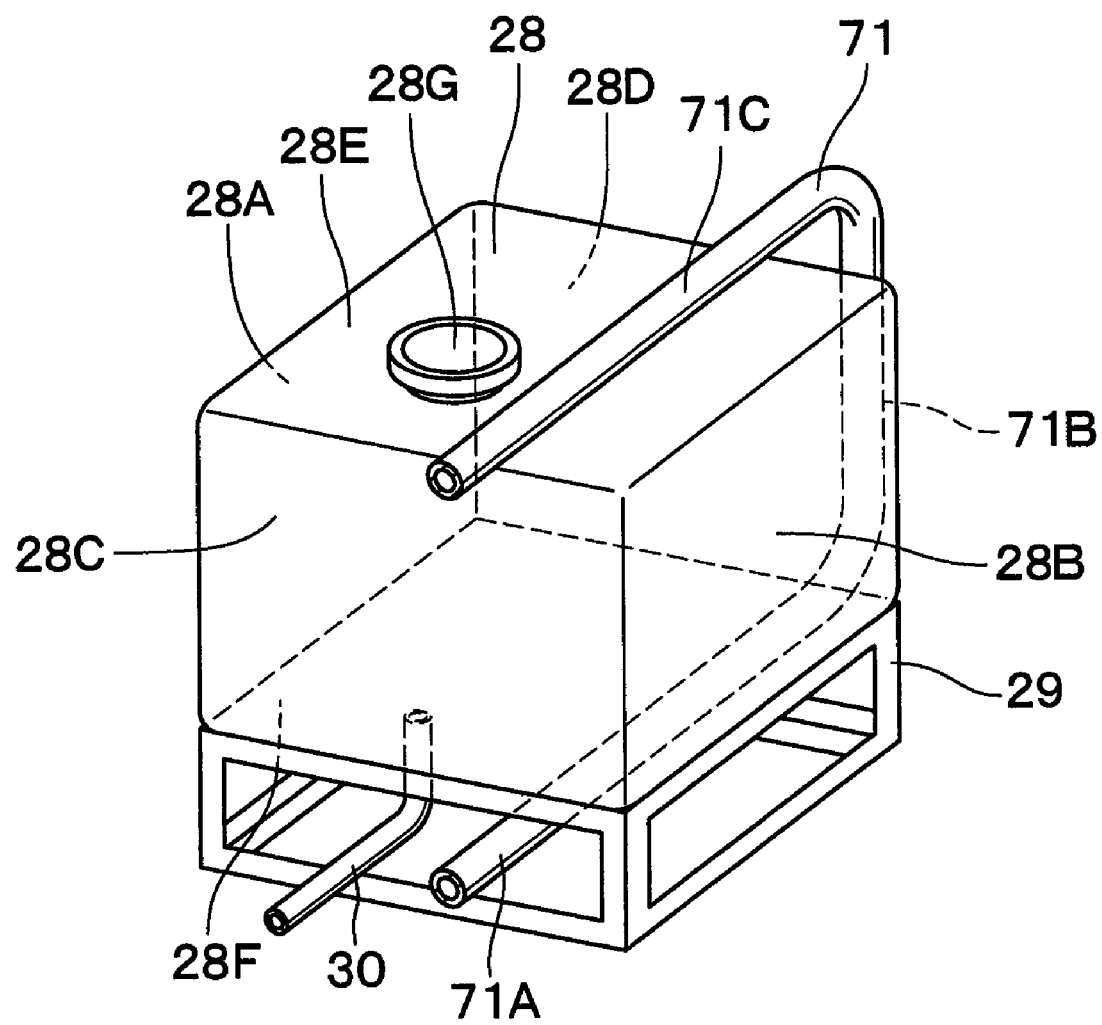
FIG. 14 is a schematic perspective view on an enlarged scale of a ureal water tank and a working mechanism operating conduit in a third modification according to the present invention.

However, in this regard, the present invention is not limited to the particular example shown. For instance, as in a third modification of the invention shown in FIG. 14, part of a working mechanism operating conduit 71 may be bent to provide a lower conduit section 71A, a right conduit section 71B and an upper conduit section 71C and these lower conduit section 71A, right conduit section 71B, and upper conduit section 71C run along exterior surfaces at the lower side surface 28F, right side surface 28D and upper side surface 28E of the ureal water tank 28, respectively. Otherwise, the working mechanism operating oil conduit 71 may be bent in different directions to run along different sides of the ureal water tank. The same structure applies to other embodiments of the invention.

Further, by way of example one working mechanism operating conduit 21 is arranged to run along exterior surfaces of the ureal water tank 28 in the first embodiment, a couple of working mechanism operating conduits 21 are arranged to run along exterior surfaces of the ureal water tank 28 in the first modification, and a couple of working mechanism operating oil conduits 54 are arranged to run along exterior surfaces of the ureal water tank 58 in the third embodiment of the invention. However, the present invention is not limited to these particular examples. If desired, three or more operating oil conduits may be arranged in such a way as to enfold the ureal water tank.

Furthermore, a working mechanism operating conduit 21 is routed around the ureal water tank 28 in the first embodiment, an oil cooler side return conduit 45 is routed around the ureal water tank 47 in the second embodiment, a working mechanism operating oil conduit 54 is routed around the ureal water tank 58 in the third embodiment, and a pressurized oil supply conduit 63 is routed around the ureal water tank 67 in the fourth embodiment. However, the present invention is not limited to these particular examples. For instance, a conduit which is connected to the vehicle drive motor 2E of the vehicular lower structure 2 or to the revolving motor 17 may be arranged to run along exterior surfaces of a ureal water tank.

On the other hand, by way of example, the above-described first embodiment employs the ureal water tank 28 in the form of a closed hexahedral container, having the front side surface 28A, rear side surface 28B, left side surface 28C, right side surface 28D, upper side surface 28E and lower side surface 28F. However, the present invention is not limited to this particular example. For instance, the ureal water tank may be a container of a pentahedral, heptahedral or other polyhedral shape. If desired, there may be employed a ureal water tank of other shapes, for example of a cylindrical or flattened spherical shape. The same structure applies to other embodiments of the present invention.

Further, in the foregoing embodiments, the present invention is applied to a crawler type hydraulic excavator 1 which is typical of automotive construction machines. However, the present invention is not limited to can be similarly applied to wheel type excavators and a wide variety of other automotive construction machines such as lift trucks, dump trucks, wheel loaders, hydraulic cranes and bulldozers.

The invention claimed is:

1. An automotive construction machine having a vehicle structure driven by a vehicle drive motor, a working mechanism operated by actuators mounted on said vehicle structure, an engine mounted on said vehicle structure to drive a hydraulic pump at the task of delivering pressurized oil, operating oil conduits for circulation of operating oil located between an oil pressure source—which is comprised of said hydraulic pump and an operating oil tank, and various actuators including said vehicle drive motor of said vehicle structure and actuators of said working mechanism through a control valve, a urea selective reduction catalyst provided in an exhaust pipe of said engine to get rid of nitrogen oxides, and a ureal water tank storing an aqueous urea solution to be injected into said exhaust pipe of said engine on the upstream side of said urea selective reduction catalyst, characterized in that:
one of said operating oil conduits is routed to run along exterior surfaces of said ureal water tank; and
heating said aqueous urea solution in said tank by heat radiation from pressurized oil or return oil in circulation through said operating oil conduit.

2. An automotive construction machine as defined in claim 1, wherein said ureal water tank is in the form of a polyhedral container which is constituted by various sides, and said operating oil conduit is arranged to run at least along two sides of said various sides.

3. An automotive construction machine as defined in claim 1, wherein said operating oil conduit connected between said control valve and an actuator of said working mechanism is a working mechanism operating conduit, said working mechanism operating conduit being arranged to run along exterior surfaces of said ureal water tank.

4. An automotive construction machine as defined in claim 1, wherein an oil cooler is provided between said control valve and said operating oil tank to cool down return oil from said actuator, said operating oil conduit connected between said control valve and said oil cooler is an oil cooler side return conduit, and said oil cooler side return conduit is arranged to run along exterior surfaces of said ureal water tank.

5. An automotive construction machine as defined in claim 1, wherein said operating oil conduit connected between said hydraulic pump and said control valve is a pressurized oil supply conduit, and said pressurized oil supply conduit is arranged to run along exterior surfaces of said ureal water tank.

6. An automotive construction machine as defined in claim 1, wherein said automotive vehicular structure is composed of a vehicular lower structure driven by said vehicle drive motor, and an upper revolving structure which is swingably mounted on said vehicular lower structure, having an engine mounted in a rear side of a revolving frame to drive said hydraulic pump and having said working mechanism built in a front side of said revolving frame, and said ureal water tank is located on said upper revolving structure.

7. An automotive construction machine as defined in claim 2, wherein said operating oil conduit connected between said control valve and an actuator of said working mechanism is a working mechanism operating conduit, said working mechanism operating conduit being arranged to run along exterior surfaces of said ureal water tank.

8. An automotive construction machine as defined in claim 2, wherein an oil cooler is provided between said control valve and said operating oil tank to cool down return oil from said actuator, said operating oil conduit connected between said control valve and said oil cooler is an oil cooler side return conduit, and said oil cooler side return conduit is arranged to run along exterior surfaces of said ureal water tank.

9. An automotive construction machine as defined in claim 2, wherein said operating oil conduit connected between said hydraulic pump and said control valve is a pressurized oil supply conduit, and said pressurized oil supply conduit is arranged to run along exterior surfaces of said ureal water tank.

* * * * *